United States Patent
Fleurence

(10) Patent No.: US 10,549,687 B2
(45) Date of Patent: Feb. 4, 2020

(54) LIGHTING DEVICE HAVING DYNAMIC LIGHTING EFFECTS FOR A PASSENGER COMPARTMENT OF A MOTOR VEHICLE

(71) Applicant: VALEO VISION, Bobigny (FR)

(72) Inventor: Thierry Fleurence, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/718,758

(22) Filed: Sep. 28, 2017

(65) Prior Publication Data

US 2018/0086258 A1    Mar. 29, 2018

(30) Foreign Application Priority Data

Sep. 28, 2016    (FR) ...................................... 16 59208

(51) Int. Cl.
| | | |
|---|---|---|
| *B60Q 3/74* | (2017.01) | |
| *B60Q 3/18* | (2017.01) | |
| *H05B 37/02* | (2006.01) | |
| *B60Q 3/80* | (2017.01) | |
| *B60Q 3/60* | (2017.01) | |
| *H05B 33/08* | (2006.01) | |

(52) U.S. Cl.
CPC ................. *B60Q 3/74* (2017.02); *B60Q 3/60* (2017.02); *B60Q 3/80* (2017.02); *H05B 33/0854* (2013.01); *H05B 33/0872* (2013.01)

(58) Field of Classification Search
CPC .. H05B 33/0854; H05B 33/0872; B60Q 1/22; B60Q 1/26; B60Q 1/34; B60Q 1/1461; B60Q 1/2603; B60Q 3/00; B60Q 3/20; B60Q 3/43; B60Q 3/60; B60Q 3/74; B60Q 3/80; B60Q 11/007
See application file for complete search history.

(56) References Cited

U.S. PATENT DOCUMENTS

| | | | | |
|---|---|---|---|---|
| 9,758,093 B2 * | 9/2017 | Backes | ................. | H05B 37/02 |
| 2004/0090317 A1 | 5/2004 | Rothkop | | |
| 2010/0302020 A1 * | 12/2010 | Lenneman | ............. | B60K 35/00 340/441 |
| 2015/0145410 A1 * | 5/2015 | Backes | ................. | H05B 37/02 315/77 |

(Continued)

FOREIGN PATENT DOCUMENTS

| | | | | |
|---|---|---|---|---|
| EP | 3 128 498 A1 | 2/2017 | | |
| WO | WO 2015014964 A1 * | 2/2015 | ............. | B60K 35/00 |

(Continued)

OTHER PUBLICATIONS

French Preliminary Search Report dated May 31, 2017 in French Application 16 59208, filed on Sep. 28, 2016 ( with English Translation of Categories of Cited Documents).

*Primary Examiner* — Wei (Victor) Y Chan
*Assistant Examiner* — Henry Luong
(74) *Attorney, Agent, or Firm* — Oblon, McClelland, Maier & Neustadt, L.L.P.

(57) ABSTRACT

The invention relates to a lighting device having dynamic lighting effects for the passenger compartment of a motor vehicle. The lighting device includes a lighting system configured to emit at least one light signal producing a dynamic effect of scrolling inside the passenger compartment in order to simulate the scrolling of the road inside the passenger compartment of the vehicle.

19 Claims, 4 Drawing Sheets

(56) References Cited

U.S. PATENT DOCUMENTS

2015/0197193 A1* 7/2015 Oba .................. B60Q 3/76
                                                              315/80
2017/0021837 A1  1/2017  Ebina
2018/0039917 A1* 2/2018 Buttolo .............. G01C 21/3438

FOREIGN PATENT DOCUMENTS

WO    WO-2015014964 A1 * 2/2015 ............. B60K 35/00
WO    WO 2015/151243 A1  10/2015

* cited by examiner

LIGHTING DEVICE HAVING DYNAMIC LIGHTING EFFECTS FOR A PASSENGER COMPARTMENT OF A MOTOR VEHICLE

The present invention relates to the technical field of motor vehicles, and more specifically to lighting devices capable of displaying information concerning the speed of the vehicle in the interior of its passenger compartment.

Driving a motor vehicle requires an awareness in real time of information concerning its operation, for example its speed. This information, which is necessary for safer driving, may be transmitted to the driver notably by means of a display screen situated at the level of the steering wheel and, more specifically, integrated into the dashboard behind the steering wheel.

This configuration suffers from the disadvantage that the display screen is not easily visible by other occupants of the vehicle. In order to address this problem, certain vehicles propose the integration of the display screen at the center of the dashboard, that is to say in the longitudinal axis of the passenger compartment. Nevertheless, this solution has the disadvantage of decentering the display screen in relation to the field of vision of the driver, all the more so as the information transmitted to the users is point information of the numerical value type changing in accordance with the speed. As a consequence of this, the driver is obliged to divert his eyes from the road in order to take note of the speed of the vehicle.

Manufacturers are looking for an optimal position of a speed indicator which can be used by all of the passengers in the vehicle and which does not cause a distraction for the driver when he is driving.

Motor vehicles are evolving, furthermore, notably in the direction of autonomously driven vehicles in which the management of the operating controls may be assured in an automatic manner by the vehicle, whether occasionally for parking operations, when driving at low speeds, or for longer periods when the vehicle is managing phases of acceleration, braking and avoiding other vehicles that are present in the road area. During each of these phases of automatic control, the attention of the driver may not be focused on the road area and/or the operating controls. In particular, the driver of a suchlike autonomous vehicle that is configured in the autonomous driving mode may be in the process of reading a book, speaking with the front-seat passenger, or may be turned facing in the direction of the rear seats. In such cases, the driver no longer necessarily has the visual sensation of being in a moving vehicle, in spite of the possible vibrations of the passenger compartment associated with the running of the vehicle and/or with the noise level of said vehicle in movement.

In other words, in the case of an autonomous vehicle configured in an autonomous driving mode, the driver of the vehicle who is no longer actively involved in his role as the driver of the vehicle may lose in part or in total the sensation of speed associated with the movement of said vehicle.

Furthermore, this loss of sensation may cause the driver to experience motion sickness similar to that experienced by the passengers of a vehicle in movement.

One aim of the invention is accordingly to restore a sensation of speed to the occupants of a vehicle, in order to reduce their susceptibility to motion sickness.

In order to address in particular the problems mentioned above, the present application proposes a lighting device having dynamic lighting effects for the passenger compartment of a motor vehicle, the passenger compartment comprising, for example, a control station and a dashboard situated in a front part of the passenger compartment, a rear part and at least one lighting system.

The invention is characterized in that the lighting device comprises a lighting system configured to emit at least one light signal producing one or a plurality of dynamic effects of scrolling inside the passenger compartment, along the longitudinal axis of the vehicle and in the direction opposite the direction of travel of the vehicle. The expression "longitudinal axis" is intended to denote an axis passing through the front and the rear of the passenger compartment, at their centers.

More precisely, the lighting device is configured so that at least one light signal emitted by the lighting system scrolls from the front towards the rear of the passenger compartment when the vehicle is moving in a forward direction. Conversely, at least one light signal may scroll from the rear towards the front when the vehicle is moving in a backward direction. In other words, the lighting device is configured to inform an occupant of the passenger compartment about the movement of the vehicle in a visual manner. The lighting effects produced by the lighting device are preferably of the dynamic type in order to reproduce an effect of speed correlated to the movement of the vehicle or to simulate the scrolling of the road. An occupant who is not looking at the road thus perceives the movement of the vehicle visually in an advantageous manner in order to reduce a phenomenon of desynchronization between the visual information and the information transmitted by his inner ear. Because of this, the invention enables the phenomenon of motion sickness, or kinetosis, to be reduced greatly by producing a dynamic visual effect inside the passenger compartment, consistent with the sensation of movement perceived by the inner ear of an occupant of the passenger compartment.

According to another characterizing feature of the invention, the lighting system is configured so that at least one light signal scrolls in a rear part of the passenger compartment. According to this alternative, the light signal is visible by an occupant who is present in the rear of the passenger compartment. According to another embodiment, the light signal is visible only in the rear part of the passenger compartment in order not to distract the driver of the vehicle.

According to another characterizing feature of the invention, the lighting system is configured so that at least one light signal scrolls in a front part of the passenger compartment. This alternative is advantageous when the vehicle is moving in an autonomous manner, that is to say without the help of a driver. The driver may thus divert his attention from the road, while continuing to receive information about the movement of the vehicle in real time. The invention permits the driver to control the speed of the vehicle in an indirect manner and also limits the phenomenon of motion sickness for the occupants of the front part of the passenger compartment.

According to another characterizing feature of the invention, the lighting system is configured so that at least one light signal scrolls in the front part, and then in the rear part of the passenger compartment. According to one alternative, the lighting system is configured in order to cause a first light signal to scroll in the front part of the passenger compartment and a second light signal to scroll in the rear part of the passenger compartment. The scrolling of the light signals may be synchronized by the lighting system in such a way that the occupants present in the front and in the rear of the passenger compartment perceive the same sensation of speed simulated by said signals. Conversely, the lighting system may also be configured to control the speed of scrolling of the first light signal and the second light signal in an independent manner. Depending on the susceptibility of the occupants of the passenger compartment to the phenomenon of kinetosis, the lighting system may thus adapt the speed of scrolling of the light signals at the front and at the rear of the passenger compartment. In other words, the speed of scrolling of a light signal may be accelerated in order to amplify the sensation of speed and/or acceleration experienced by an occupant of the vehicle, or may also be decreased when the occupant becomes less susceptible to motion sickness.

According to another characterizing feature of the invention, the lighting device comprises a control module configured to receive information originating from an autonomous driving module of the vehicle, such that the control module configures, and notably activates or deactivates, the lighting system on the basis of this information. In other words, the lighting device is capable of being controlled by an autonomous driving module.

According to another characterizing feature of the invention, the control module is configured to receive information, originating from detection means, concerning the presence of an occupant inside the passenger compartment and to process this information in order to control the lighting system. More precisely, the means of detection are configured to identify the presence of one or a plurality of occupants in the front and/or in the rear of the passenger compartment. More particularly, the detection device is configured to recognize the presence of an occupant or a driver at a control station of the passenger compartment. The lighting system is thus capable of activating the lighting system when an occupant takes his place inside the passenger compartment. Conversely, the lighting system is capable of interrupting one of the light signals scrolling at the front or at the rear of the passenger compartment, independently of the other, for example when an occupant leaves the rear part of the passenger compartment or when he becomes less susceptible to the phenomenon of motion sickness. The means of detection thus enable the lighting system to be activated automatically in the one or more occupied parts of the passenger compartment, in order to conserve the electrical resources of the vehicle.

According to another characterizing feature of the invention, the lighting system is configured so that at least one light signal scrolls at a speed proportional to the speed of travel of the vehicle. This alternative allows the phenomenon of kinetosis due to desynchronization between the visual information visual and the information perceived by the inner ear to be reduced advantageously during movement of the vehicle. Furthermore, this alternative enables information concerning the changes in speed of the vehicle to be given to the occupants of the passenger compartment. Notably, the lighting system may be configured so that at least one light signal scrolls at the speed of travel of the vehicle. As a variant, the lighting system is configured so that at least one light signal scrolls at a speed proportional to the acceleration of the vehicle. According to another variant, the lighting system is configured so that at least one light signal scrolls at a speed greater than the speed of travel of the vehicle. This alternative is particularly advantageous in order to draw the attention of an occupant of the passenger compartment to an excessive speed and/or a situation of risk for the vehicle. By way of example, the speed of scrolling may increase suddenly as the authorized speed is exceeded and/or in the case of the detection of a traffic jam or in order to report an accident on the road. According to another example, the color of a light signal may vary when the vehicle approaches or exceeds the authorized speed. The color of the light signal may thus be green when the vehicle is moving below the speed limit, then orange when it approaches this limit, then red when it exceeds said limit.

According to different characterizing features of the invention, provision may be made:

for the lighting system to be configured to emit simultaneously at least two distinct light signals inside the passenger compartment;

for the lighting system to be configured to emit at least two divergent light signals in the direction of the rear of the passenger compartment;

for the lighting system to be configured to emit a light signal scrolling from either side of the passenger compartment, moving from the front towards the rear.

The light signals may move at the level of the roof and/or the doors of the passenger compartment. The light signals may move laterally to either side of the vehicle, for example by being synchronized in order to simulate more closely the scrolling of the landscape to either side of the vehicle.

According to other characterizing features of the invention, the lighting system is configured to emit a light signal illuminating at least partially a part of the floor of the passenger compartment, and/or illuminating at least partially a part of the roof of the passenger compartment.

According to another characterizing feature of the invention, the lighting system is configured to emit a light signal illuminating at least partially a part of a lateral wall of the passenger compartment, for example a panel of a door.

According to another characterizing feature of the invention, the lighting system comprises at least one light strip including a plurality of light sources illuminating one after the other in such a way as to cause at least one light signal to scroll. According to one particular embodiment of the invention, one or a plurality of optical guides may be associated with the lighting system in order to optimize the diffusion or the dispersion of the light inside the passenger compartment.

According to another characterizing feature of the invention, the lighting system comprises light sources of the light-emitting diode type. The lighting system may, alternatively or in combination, comprise a video projection device.

According to another characterizing feature of the invention, the lighting device comprises an interface permitting a user to control the shape and/or the pattern and/or the dimensions and/or the color and/or the intensity and/or the speed of scrolling of at least one light signal emitted by the lighting system. The interface may be configured in order to permit a user to select one or a plurality of parts of the passenger compartment illuminated by the lighting system.

The invention also relates to a motor vehicle comprising a lighting device as described above. According to one variant, the motor vehicle comprises an autonomous driving module.

The invention also concerns a method of lighting a motor vehicle comprising a passenger compartment, a control module and a lighting device as described above. The control module is configured to implement the following steps:

identification of the driving mode of the vehicle;

determination of the speed of travel of the vehicle;

choice of the operating parameters of the lighting system depending on the speed of travel of the vehicle;

activation of the lighting depending on said parameters.

According to one characterizing feature of the method, the choice of the operating parameters comprises the identification of one or a plurality of zones of the passenger compartment to be illuminated by the lighting system. More precisely, the one of more zones of the passenger compartment to be illuminated by the lighting system depend on the driving mode of the vehicle identified previously by the control module. For example, the control module defines the rear part of the passenger compartment as a zone that can be illuminated by the lighting system, when the control module previously identifies an autonomous driving mode of the vehicle. According to another example, the control module defines the rear part and/or the front part of the passenger compartment as zone(s) that can be illuminated by the lighting system, when the control module identifies a manual driving mode of the vehicle.

According to another characterizing feature of the method, the choice of the operating parameters comprises as a parameter the speed and/or the acceleration of the scrolling of the light signal inside the passenger compartment of the vehicle.

The characterizing features of the invention mentioned above, as well as others, will be appreciated more clearly from a perusal of the description below, which refers to the following accompanying drawings.

As a reminder, the aim of the present invention is to propose a lighting device having dynamic lighting effects for the passenger compartment of a motor vehicle, configured to inform an occupant of the passenger compartment about the movement of the vehicle in a visual manner in order, notably, to limit the phenomenon of motion sickness.

Figure 1:
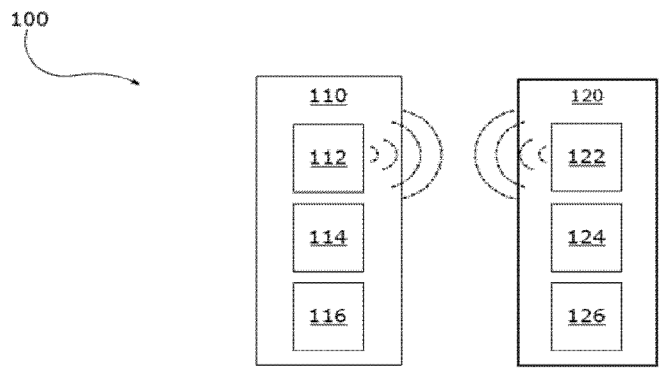
FIG. 1 is a schematic view of a lighting device for an autonomous motor vehicle according to the invention.

For this purpose, the invention proposes a lighting device 100 having dynamic lighting effects, An illustrative embodiment of the lighting device is depicted in FIG. 1. According to this example, the lighting device 100 comprises a control module 110 and a lighting system 120 controlled by said module. The control module 110 includes a communication Unit 112 connected to the lighting system 120 and capable of being connected to another device in order to receive commands from said device. Another device may, for example, be an on-board computer of a motor vehicle and/or a navigation device and/or a communication device of the mobile telephone type. The expression "connected" is intended to denote the possibility for two entities to exchange information. The entities may be connected by a physical link, for example ore or a plurality of conducting wires or, preferably, by a wireless link of the "WIFI" or "Bluetooth" type. The communication unit 112 is connected to a calculator 114 of the central processing unit type, thereby enabling these commands to be converted into operating instructions for the lighting system 120, More precisely, the calculator 114 is connected to a memory unit 116 and is configured in order to associate operating; parameters of the lighting system, pre-recorded and stored in the memory unit 116, with each command. The operating parameters are then transmitted to the lighting system 120 by means of the communication unit 112.

The lighting system 120 incorporates a communication unit 122 to transmit these operating parameters to a calculator 124, configured to convert these parameters into characterizing operating features for one or a plurality of light assemblies 126. The calculator 124 is configured to activate and deactivate each light assembly on command, while controlling their characterizing operating features, that is to say, the color, the intensity, the frequency and the emission time of the light emitted by a light assembly.

A light assembly 126, notably in the examples illustrated in FIGS. 1 to 10, may comprise a plurality of light sources, aligned in a longitudinal series, in such a way as to form a strip, along which the successive activation of said light sources permits the scrolling of one or a plurality of light signals. A light source may comprise one or a plurality of light-emitting diodes (LED) 127, and notably one or a plurality of LEDs with colors, possibly different colors, or white LEDs or of the RGB type (for the acronym Red-Green-Blue), the operation of each light-emitting diode being controlled by the control module 110.

According to one alternative, a light assembly 126 may comprise a video projection device 129 configured to project a beam of light onto an element of the passenger compartment or a glazed surface. Preferably, the dimensions of the video projection device are adapted to permit its integration into an element of the passenger compartment, for example a dashboard or a roof light. According to one alternative embodiment, not depicted here, one or a plurality of mirrors enabling its beam of light to be oriented onto specific zones of the passenger compartment of a vehicle may be associated with the video projection device 129. Optionally, one or a plurality of mirrors may be movably mounted, and notably in rotation, in order to modify their orientation by the control module 110 so as to enable the beam of light to perform a light scan of the passenger compartment in a direction parallel or substantially parallel to the movement of the vehicle.

Figure 2:
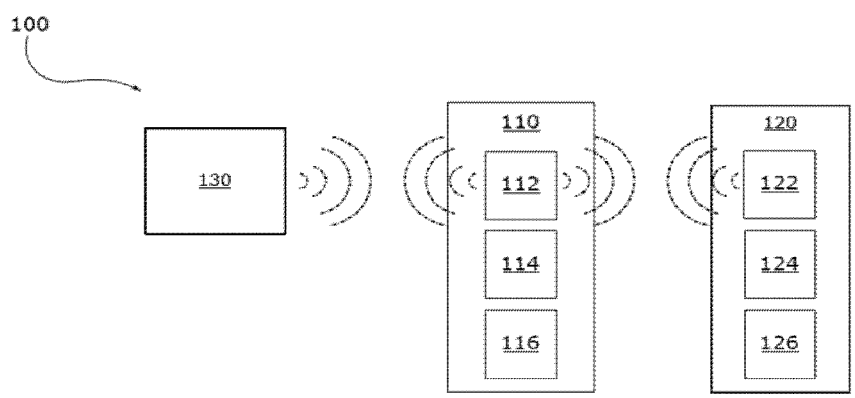
FIG. 2 is a schematic view of a variant embodiment of a lighting device depicted in FIG. 1.

According to a variant embodiment depicted in FIG. 2, the lighting device 100 described above may comprise an interface 130 connected to the communication unit 112 in order to permit a user to modify and/or record new operating parameters at the level of the memory unit 116. The user may personalize one or a plurality of light signals emitted by the lighting system 120, depending on his preferences and/or on the configuration of the passenger compartment of his motor vehicle.

Figure 3:
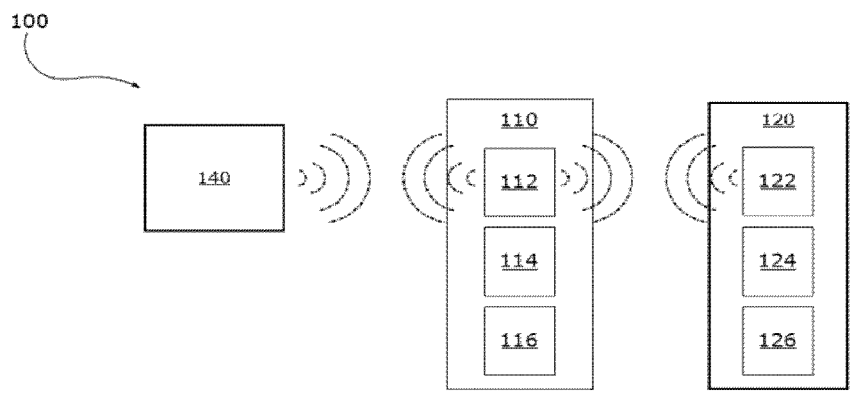
FIG. 3 is a schematic view of another variant embodiment of a lighting device depicted in FIG. 1.

According to another variant embodiment depicted in FIG. 3, the lighting device 100 may also comprise means of detection 140 of the presence of one or a plurality of occupants inside a motor vehicle, so as to permit the lighting device 100 to activate one or a plurality of light assemblies that can be seen by at least one occupant of the vehicle. The means of detection 140 may notably be configured to transmit the position of the occupants inside the vehicle so as to permit the lighting device 100 to activate the one or more light sources that are most likely to be seen by one and/or other of the occupants in order to permit him to control the speed of the vehicle when the vehicle is being controlled by an autonomous driving module and/or to permit him to counteract possible motion sickness.

A lighting device 100 according to the invention may, of course, include one or a plurality of variants as described above, depending on the passenger compartment of the motor vehicle intended to be equipped with the lighting device and/or with the preferences of its user.

The invention may be intended to equip an autonomous motor vehicle 200 comprising a passenger compartment 210, inside which are present a driver's seat 212 and a plurality of passenger seats 214. The seats situated at the front of the passenger compartment face towards a dashboard 216 including a control station 218 positioned facing towards the driver's seat 212. The control station 218 comprises operating controls 220 including a steering wheel 222 permitting the driver to direct the movement of the vehicle, an on-board computer 224 centralizing the information associated with the operation of the vehicle and an autonomous driving module 226 configured in order to displace the vehicle without the intervention of the driver. The on-Nard computer 224 comprises an interface 228 permitting the driver to consult and to modify certain characterizing features of the vehicle and to activate or to deactivate the autonomous driving module 226. The control module 110 is positioned inside the vehicle and is connected to the autonomous driving module 226, and to the on-board computer 224, by means of its communication unit 112, such as to receive commands emitted by the autonomous driving module and/or the on-board computer. The lighting system 120 is arranged inside the passenger compartment 210 so as to be visible by the driver of the vehicle and/or a passenger.

The lighting system 120 may be arranged in different ways inside the passenger compartment 210, depending on its configuration, its size and/or the preferences of the user of the vehicle 200. A plurality of illustrative arrangements of the lighting system 120 inside a passenger compartment 210 are presented above. These examples are not restrictive for the invention and may be combined in order to obtain other types of arrangement.

Figure 4:
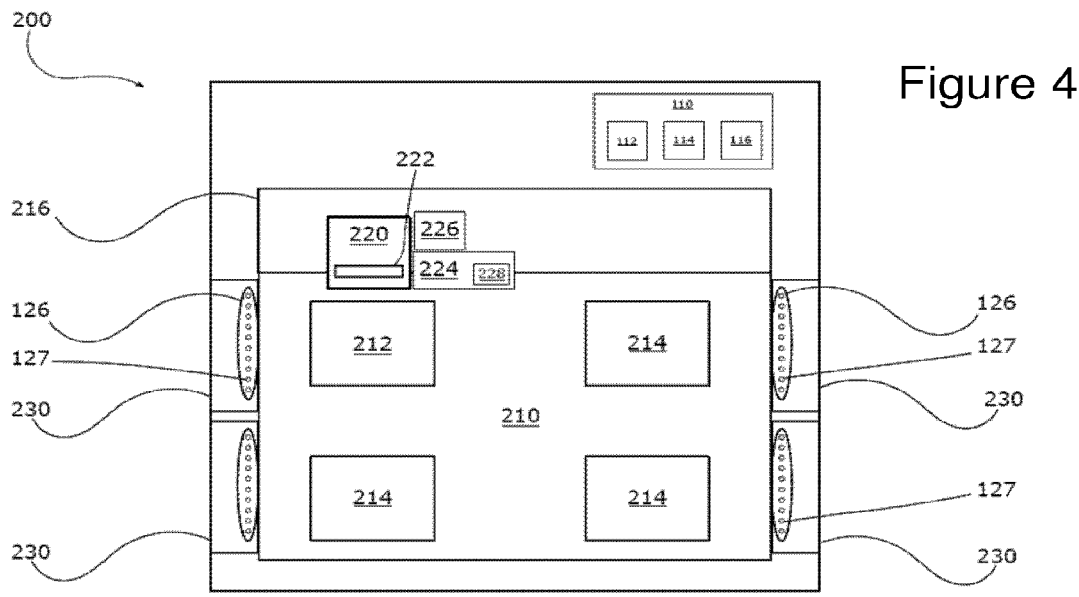
FIG. 4 is a schematic view of an autonomous motor vehicle comprising a lighting device as previously illustrated.

According to a first illustrative arrangement depicted in FIG. 4, a light assembly 126 as described above is fixed on or in the trim of each door 230 of the passenger compartment 210. Each light assembly 126 is oriented in order for the light-emitting diodes 127 by which it is constituted to be aligned or substantially aligned along the longitudinal axis of the passenger compartment 210. According to a variant embodiment, the light assemblies 126 may be arranged inside the passenger compartment in such a way as to give the illusion of a continuous light strip on each side of the passenger compartment when the doors 230 are closed. The light-emitting diodes are controlled by the control module no in such a way as to be illuminated successively, one after the other, in order to produce a dynamic lighting effect, longitudinally, in the direction opposite the movement of the vehicle.

Figure 5:
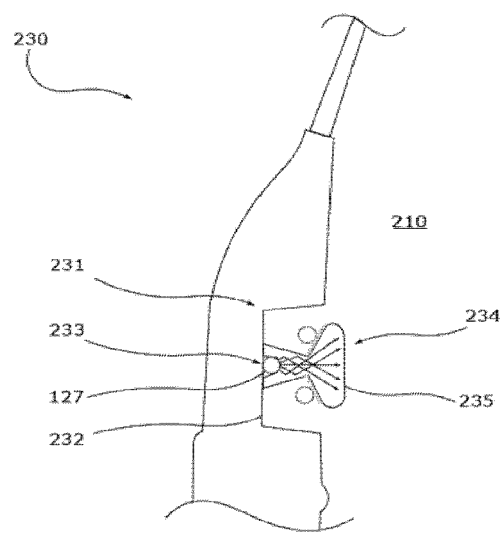
FIGS. 5 and 6 depict schematic views of a door of an autonomous motor vehicle according to FIG. 4.
Figure 6:
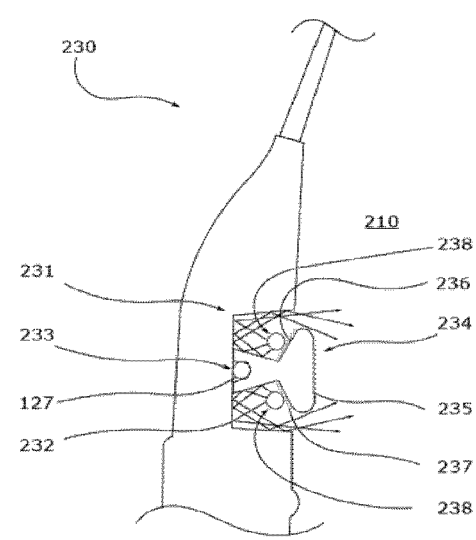

According to one particular embodiment illustrated in FIGS. 5 and 6, each door 230 includes a housing 231 recessed into the thickness of the door panel and extending from the front towards the rear of the passenger compartment. The housing includes at the level of its bottom 232 a first group 233 of light-emitting diodes 127, as described above. The first group of diodes is covered by an optical device 234 serving as an optical guide, in order for the light emitted by the light-emitting diodes 127 to illuminate the passenger compartment directly at the level of a front face 235 of the optical device, as depicted in FIG. 5. The optical device 234 includes a base which extends from the bottom 232 of the housing 231 and a head which extends this base towards the passenger compartment and which exhibits said front face 235. This head of the optical device further exhibits, at the level of its rear face 236 facing towards the bottom 232, a layer that is optically opaque 237 to the light emitted by the light-emitting diodes 127. A second group 238 of light-emitting diodes 127 is fixed on this layer in such a way that the light which they emit is reflected on the walls of the housing 231 before illuminating the passenger compartment 210, as depicted in FIG. 6. An occupant of the passenger compartment may thus perceive an indirect light signal, of lower intensity and more diffuse, when the second group 238 emits light in relation to the first group 233. Depending on the susceptibility and/or the preferences of the occupants, the control module no may be configured in order to activate the first group 233 or the second group 238 of light-emitting diodes.

Figure 7:
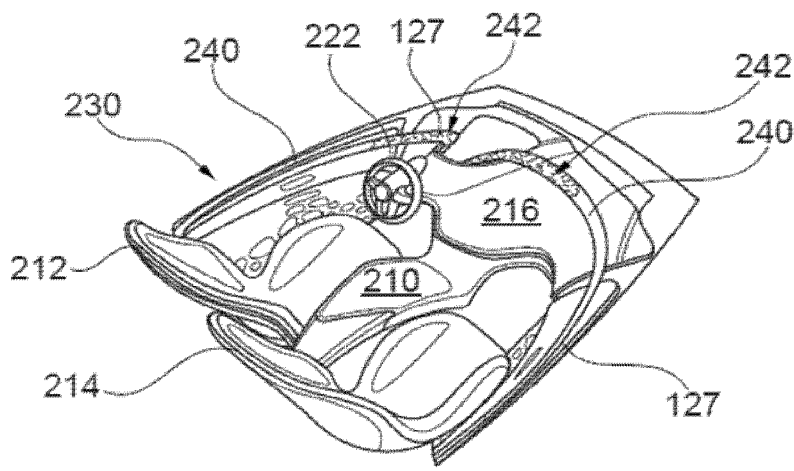
FIGS. 7 to 9 depict a view in perspective of the passenger compartment of an autonomous motor vehicle according to FIG. 4.
Figure 8:
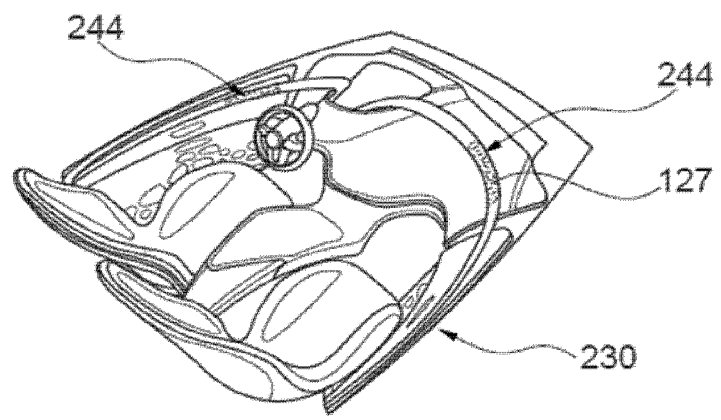
Figure 9:
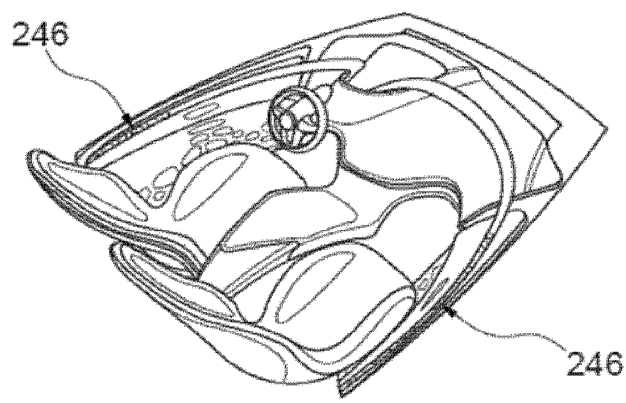

According to a second illustrative arrangement illustrated in FIGS. 7 to 9, the passenger compartment 210 may comprise two light strips 240 extending respectively to either side of the vehicle and in this way forming a support for two divergent signals from the driving position in the direction of the rear of the vehicle. These light strips include an initial portion which extends on the dashboard from the steering wheel 222 and a final portion which extends towards the rear of the passenger compartment along the left-hand and right-hand doors 230 respectively. It will be appreciated that, in a suchlike arrangement, the initial portion, which extends substantially transversely to the direction of travel of the vehicle, essentially exhibits an aesthetic character in order to give the impression to the users that the light signal departs from the steering wheel, whereas the final portion permits the occupants to be given information concerning the movement and the speed of the vehicle, which is particularly effective notably for dealing with motion sickness.

Each light strip includes light-emitting diodes 127, and the diodes corresponding to the final portion of the strip are aligned substantially longitudinally from the front towards the rear of the vehicle. The light-emitting diodes are controlled by the control module 110 in such a way as to be illuminated successively, one after the other, in order to produce a dynamic lighting effect, transversely in the direction of movement of the vehicle, for the initial portion of the light strip, and longitudinally in the direction opposite to the movement of the vehicle, for the final portion of the strip. In other words, the control module 110 activates the light-emitting diodes of a light assembly progressively in such a way as to generate a beam of light moving from the rear towards the front of the passenger compartment of the vehicle when the vehicle is moving in a backward direction, or in such a way as to generate a beam of light moving from the front towards the rear of the passenger compartment of the vehicle when the vehicle is moving in a forward direction.

More particularly, a sequence of lighting the diodes corresponding to a forward direction of the vehicle is illustrated in FIGS. 7 to 9. At the start of the sequence, the control module 110 selects a first light assembly 242, in this case situated closest to the steering wheel and/or to the front of the passenger compartment, as depicted in FIG. 7, and activates it. It is feasible at this stage to have simultaneous lighting of the diodes making up this first assembly or successive lighting of the diodes towards the exterior of the vehicle, that is to say from the steering wheel towards the door. At the end of a time that is set and pre-recorded in the control module, said time being capable of being dependent on the speed of the vehicle, the control module deactivates the first light assembly before activating a second light assembly 244 situated laterally at the level of the front doors, as depicted in FIG. 8. Here too, the control module may be configured so as to provide simultaneous lighting of the diodes making up this second assembly or successive lighting of the diodes of this second assembly towards the rear of the vehicle. The second light assembly is deactivated in turn before activating a third light assembly 246 situated longitudinally at the level of the driver, as depicted in FIG. 9. The successive activation of the different light assemblies thus creates the illusion, for an occupant of the vehicle, of a dynamic light signal moving from the front towards the rear of the passenger compartment in a direction opposite the direction of movement of the vehicle in a forward direction. The passage from one light assembly to the other, as described immediately above, may be sequential, that is to say the lighting of one of them takes place after the extinction of the previous one, or may be continuous, that is to say that the lighting of one of these takes place simultaneously with the extinction of the previous one.

The control module may thus be configured in order for the lighting of the diodes to be successive with an extinction of the source "n" of the series of the light assembly, or of the sources "n", after the lighting of the source "n+1", or the sources "n+1", such that the light strip retains a constant dimension as it moves from the rear towards the front of a vehicle travelling in a rearward direction or from the front towards the rear of a vehicle travelling in a forward direction. As a variant, the control module may be configured in order to leave the sources lit according to the lighting of the following sources, such that the light strip grows in the direction of the steering wheel, by providing a movement towards the front of the vehicle in this case, too.

Other light assemblies may be implemented in order to illuminate in the rear part of the passenger compartment, and the possibilities offered by an arrangement of the light assemblies in the front part and in the rear part of the passenger compartment are now described below.

The light sources that are illuminated successively or simultaneously by one and the same light assembly may be the totality of the light sources of the same assembly, or may be only a portion of the diodes thereof. Notably, when the lighting device 100 comprises means of detection 140 of the presence of a driver inside the passenger compartment 200, as described above, the control module no may define a limited number of diodes to be illuminated in order to form the alarm signal light strip. The first diode or the first assembly of light-emitting diodes to be illuminated is determined depending on the position of the driver or depending on the zone at which the driver is looking at the moment of detection, the last diode, or the last assembly of diodes, to be illuminated being determined by the study of the field of vision of the driver, in order to ensure that the latter is visible by the driver. In other words, a first source of the series to be illuminated and a last source of the series to be illuminated are defined: the last source is situated further to the rear of the vehicle than the first source when the vehicle is travelling in a forward direction.

As described below, the number of passengers or the detected driving mode (autonomous or manual) may also be taken into consideration in order to define the extent of the light strip.

Figure 10:
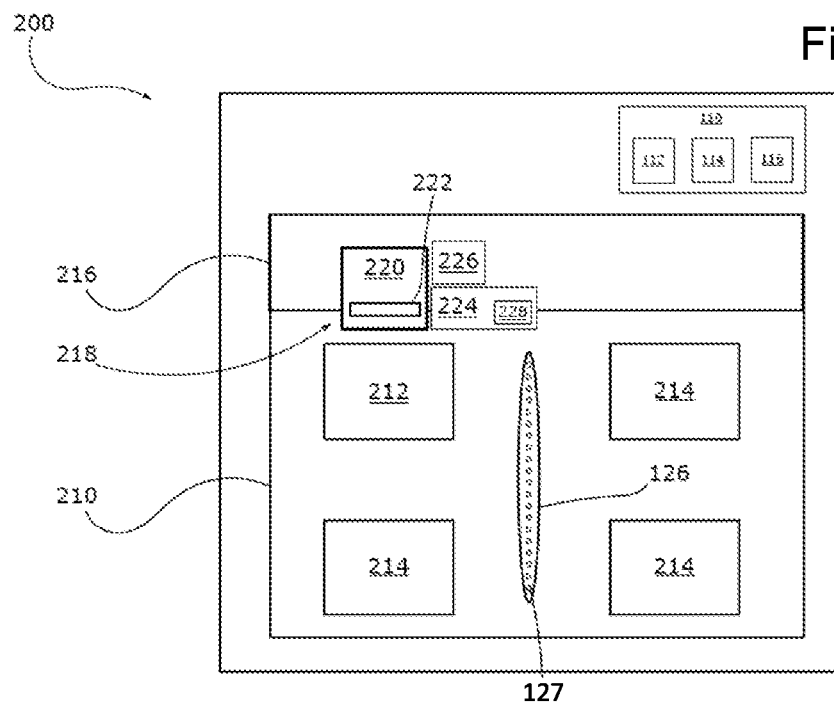
FIG. 10 is a schematic view of a variant of an autonomous motor vehicle comprising a lighting device arranged in this example on the roof or on the floor of the vehicle.

According to a third illustrative arrangement depicted in FIG. 10, the lighting means 120 include a light assembly 126 as described above, arranged on the central axis of the vehicle, that is to say between the two front seats of the vehicle. This central light assembly may also be arranged on or in the floor trim and/or on or in the roof of the passenger compartment. The light assembly 126 is oriented in such a way that the light-emitting diodes 127 by which it is constituted are aligned or substantially aligned along the longitudinal axis of the passenger compartment 210.

Figure 11:
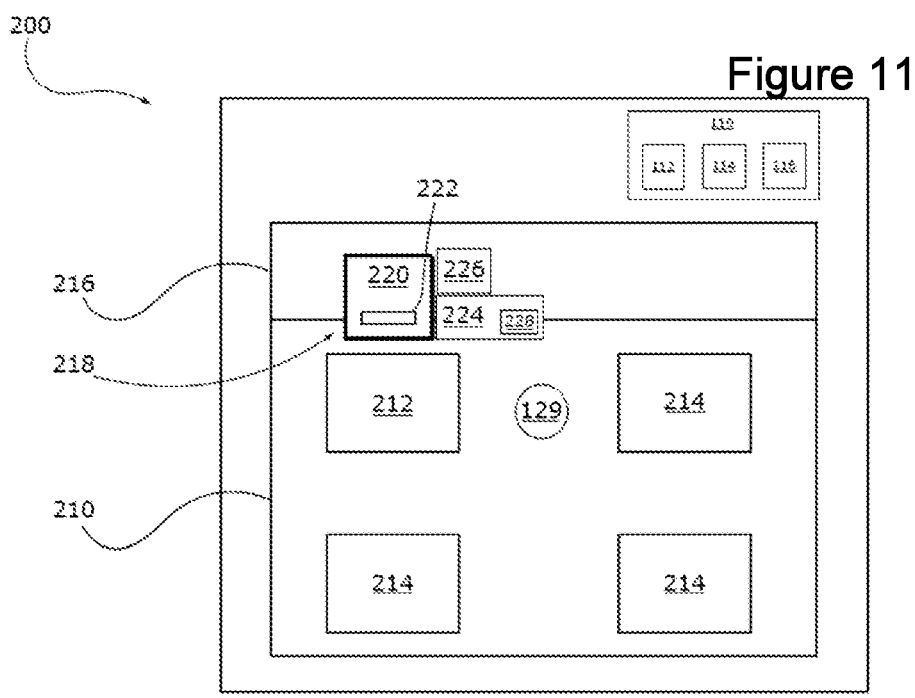
FIG. 11 is a schematic view of another variant of an autonomous motor vehicle comprising a warning light device according to the invention.

According to a fourth illustrative arrangement depicted in FIG. 11, the lighting system 120 comprises a video projection device 129 as described above, arranged at the level of the roof of the passenger compartment in such a way as to be able to project a light signal onto a surface of the passenger compartment. Preferably, the video projection device is arranged in order to illuminate the trims of the doors and/or the floor and/or the roof of the passenger compartment 210. The beam of light from the video projection device 129 may be oriented in such a way as to be able to illuminate a zone of the passenger compartment with a dynamic image. The expression "dynamic image" is intended to denote an image reflecting the scrolling of a light signal on said zone.

According to an alternative embodiment, not depicted here, one or a plurality of mirrors enabling the light emitted by one or a plurality of light-emitting diodes 127 to be oriented onto specific zones of the passenger compartment may be associated with the light assembly 126. Optionally, one or a plurality of mirrors may be mounted on a mobile platform, of which the orientation may be modified by the control module no in order to be able to perform a light scan of the passenger compartment in a direction parallel or substantially parallel to the movement of the vehicle 200.

The present invention also relates to a method of using a lighting device 100 arranged in a motor vehicle 200 as described above. The method of using proposes to give visual information concerning the direction of movement of the vehicle and, where appropriate, concerning the speed and/or the acceleration of the vehicle 200 to one or a plurality of its occupants.

More precisely, the different steps of the method of using are implemented by the control module no in the following manner. According to a first step, the control module no identifies the driving mode of the vehicle, notably by determining whether the vehicle is being operated by a driver, in a manual driving mode, or by an autonomous driving module 226, in an autonomous driving mode. To do this, the control module may verify in particular whether the autonomous driving module 226 is activated. Of course, this step may be optional when the vehicle is not equipped with an autonomous driving module. According to a second step, the control module no determines at least the direction of movement of the vehicle. It may interrogate the on-board computer 224 of the vehicle 200 for this purpose, or it may connect to a device capable of communicating this information to it. In this second step, the control module may also retrieve information concerning the speed and the instantaneous acceleration of the vehicle in the course of its movement. According to a third step, the control module identifies, on the basis of previously determined data and values, operating parameters of the lighting system 120 that are pre-recorded and stored in its memory unit 116, the operating parameters comprising both information concerning the type of beam of light to be emitted and the identification of one or a plurality of zones of the passenger compartment to be illuminated by the lighting system 120. The operating parameters are then transmitted to the lighting system 120 in such a way as to activate one or a plurality of light assemblies 126 that are present in the one or more selected zones.

The operating parameters of the lighting system 120 are chosen in such a way that at least one light assembly 126 emits a dynamic light signal inside the passenger compartment 210 which is moving in a direction parallel or substantially parallel to the movement of the vehicle and in the opposite direction. In the case of the movement of the vehicle in a forward direction, the dynamic light signal moves from front to rear, whereas in the case of movement of the vehicle in a reverse direction, the dynamic light signal moves from rear to front.

The light signal also proposes to simulate the scrolling of the landscape and to give an illusion of speed to the occupants of the vehicle. Preferably, the light signal is moving at a speed proportional to that of the vehicle and it is reproduced periodically, in order to provide information about the speed of the vehicle in real time. The frequency of the light signal may be adapted depending on each light assembly, such that a passenger may see at the same time one or a plurality of light signals emitted by one and the same light assembly. By way of example, the frequency of the light signal may increase depending on the speed of the vehicle, in order to give the illusion of a denser landscape. According to another example, the color of the light signal may also vary depending on the speed. It may vary from a soft color to a bright color depending on the speed of the vehicle. For example, the light signal may be green in color when the vehicle is observing the speed limits, orange when it is approaching the speed limit and red when it exceeds the speed limit. The color of the light signal may also be chosen in order to report a future event, for example road works, greater traffic density, an accident, changes in the atmospheric conditions (rain, hail, snow, fog), etc. Color codes may thus be associated with the light signal depending on the situations listed above. According to another example, the pattern of the light signal may also vary depending on said situations.

As mentioned previously, the zone of the passenger compartment to be illuminated by the lighting system 120 is determined by the control module 110.

The control module no may activate one or a plurality of light assemblies 126 arranged at the rear of the passenger compartment 210 in such a way as to permit a passenger seated in the rear to have visual information concerning the speed of the vehicle.

It is possible to adapt this activation to the identification of the presence of at least one passenger behind the driver by the means of detection 140. This makes it possible, notably, to manage the saving of energy by not lighting any light sources that the driver would not be able to see by virtue of the fact that his attention is being directed at the road, or at least by virtue of his position turned facing towards the front of the vehicle in an autonomous driving mode.

It is also possible to restrict the activation of a light assembly to this zone at the rear of the passenger compartment, in order to give information to the passengers seated in the rear of the vehicle concerning the direction of movement and its speed and/or its acceleration, and notably in order to prevent them from experiencing the onset of motion sickness, while avoiding the production of a light signal in the front of the passenger compartment that is visible by the driver and potentially distracting for his driving action.

According to another example, the zone on which the light assemblies are to be illuminated may depend on the detection of a driving mode by the control module 110.

When the latter determines that the vehicle is being controlled by an autonomous driving module 226, it may control the activation of each of the diodes of the different light assemblies in order to bring about illumination from front to rear in the case of the movement of the vehicle in the forward direction, that is to say dynamic illumination according to the invention in the opposite direction of travel of the vehicle, for the entire length of the passenger compartment.

The control module no may execute a supplementary step consisting of identifying the position of the driver inside the passenger compartment 210, before identifying the zones requiring to be illuminated by the lighting system 120. For this purpose, the control module no may be connected to means of detection 140 as described above. Depending on the position of the driver, the control module no may activate only the one or more light assemblies that are situated in front of the driver in order to minimize the electrical consumption of the lighting device 100. The driver may thus perceive the light signals emitted by at least one light assembly 126, regardless of its position in the vehicle. Consequently, including when the driver is not paying attention to the road, he may control the speed of the vehicle by means of light signals emitted by one or a plurality of light assemblies 126. The light signals may also assist the driver to counteract possible motion sickness when he is not at the controls of the vehicle.

The control module no may also select different light assemblies according to the wishes of the occupants of the passenger compartment. For example, the control module may activate the first group of light-emitting diodes 233 and/or the second group 238 that are present in the doors 230 depicted in FIGS. 5 and 6, in order to vary the intensity of the light signal perceived by the occupants of the vehicle. As has been described previously, it is thus possible to trigger direct illumination via the first group of diodes or indirect illumination via the second group of diodes depending on any information that is conveyed in addition to the information concerning the movement of the vehicle, and notably the speed, the acceleration, the exceeding of certain prerecorded thresholds, such as a speed limit or a maximum fuel consumption.

The control module no may modify the intensity of a light signal emitted by one or a plurality of light assemblies depending on the ambient luminosity, in order for the latter to be more or less perceptible by the occupants of the vehicle. Notably, the control module will be able to control with an intensity differently from the light-emitting diodes and, for example, by causing the intensity of a light signal to decrease when the luminosity reduces, in such a way that the perception of the light signal is substantially the same, both by day and by night, or it may also determine the lighting of a particular group of diodes in order to achieve direct, more visible illumination, or indirect illumination.

In conclusion, the invention proposes a lighting device having dynamic lighting effects permitting the occupants of a vehicle to take note rapidly and easily of the speed of movement of the vehicle. The invention thus proposes to facilitate the transport of persons who are susceptible to travel sickness, by enabling them to have visual information that is coherent with the sensation of movement perceived by their inner ear. According to another advantage of the invention, the lighting device permits the driver to control the speed of the vehicle when it is operating in autonomous driving mode, without the need for him to focus his attention at the level of the control station.

The invention claimed is:

1. A lighting device having dynamic lighting effects for a passenger compartment of a motor vehicle, the passenger compartment having a front passenger area and a rear passenger area, wherein the lighting device comprises:

a lighting system configured to emit at least one light signal producing a dynamic effect of scrolling inside the passenger compartment along a longitudinal axis of the motor vehicle and in a direction opposite to a direction of travel of the motor vehicle, the lighting system having a light assembly extending along a length of the passenger compartment; and a control module configured to receive information originating from an autonomous driving module of the motor vehicle, such that the control module configures the lighting system and controls the at least one light signal on a basis of the information to generate a front light signal to scroll in the front passenger area and to independently generate a rear light signal to scroll in the rear passenger area and to scroll the front light signal at a first scrolling speed and to scroll the rear light signal at a second scrolling speed different from the first scrolling speed at the same time.

2. The lighting device according to claim 1, wherein the lighting system is configured so that the at least one light signal scrolls from the front to the rear passenger areas.

3. The lighting device according to claim 2, wherein the lighting system is configured so that the at least one light signal scrolls at a speed proportional to a speed of travel of the motor vehicle.

4. Lighting device according to claim 2, the lighting system is configured to emit simultaneously at least two distinct light signals inside the passenger compartment.

5. The lighting device according to claim 1, wherein the control module is configured to receive information originating from detection means concerning the presence of an occupant inside the passenger compartment and to process this information in order to control the lighting system.

6. The lighting device according to claim 1, wherein the lighting system is configured so that the at least one light signal scrolls at a speed proportional to the speed of travel of the vehicle.

7. The lighting device according to claim 6, wherein the lighting system is configured so that the at least one light signal scrolls at the speed of travel of the vehicle.

8. The lighting device according to claim 1, wherein the lighting system is configured to emit simultaneously at least two distinct light signals inside the passenger compartment.

9. The lighting device according to claim 1 wherein the lighting system comprises at least one light strip including a plurality of light sources illuminating one after the other in such a way as to cause the at least one light signal to scroll.

10. A motor vehicle comprising the lighting device according to claim 1.

11. The lighting device according to claim 1, wherein the lighting system is configured so that the at least one light signal scrolls in a front part of the passenger compartment.

12. The lighting device according to claim 1, wherein the control module controls the at least one light signal by independently controlling speeds of scrolling of the first and second light signals based upon a kinetosis condition of a passenger.

13. The lighting device according to claim 1, wherein the light assembly produces the effect of scrolling along an entire length of the passenger compartment.

14. The lighting device according to claim 1, wherein the control module is configured to generate the rear light signal to not be a time-delayed version of the front light signal.

15. A method of lighting a motor vehicle, wherein the motor vehicle includes a lighting device having dynamic lighting effects for a passenger compartment of a motor vehicle, the passenger compartment having a front passenger area and a rear passenger area, wherein the lighting device comprises:

a lighting system configured to emit at least one light signal producing a dynamic effect of scrolling inside the passenger compartment along a longitudinal axis of the motor vehicle and in a direction opposite to a direction of travel of the motor vehicle, the lighting system having a light assembly extending along a length of the passenger compartment; and a control module configured to receive information originating from an autonomous driving module of the motor vehicle, wherein the control module is configured to implement the following steps:

identification of a driving mode of the vehicle;

determination of a speed of travel of the vehicle;

choice of operating parameters of the lighting system depending on the speed of travel of the vehicle;

activation of the at least one light signal produced by the lighting system depending on said parameters, wherein the choice of the operating parameters comprises identification of one or a plurality of zones of the passenger compartment to be illuminated by the lighting system, and wherein the choice of the one or more zones of the passenger compartment to be illuminated depends on the driving mode of the motor vehicle; and control of the at least one light signal on a basis of the information to generate a front light signal to scroll in the front passenger area at a first scrolling speed and to independently generate a rear light signal to scroll in the rear passenger area at a second scrolling speed different from the first scrolling speed at the same time.

16. The method of lighting according to claim 15, wherein the control module defines a rear part of the passenger compartment as a zone that can be illuminated by the lighting system, when the control module identifies an autonomous driving mode of the motor vehicle.

17. The method of lighting according to claim 15, wherein the control module defines a rear part and/or a front part of the passenger compartment as a zone that can be illuminated by the lighting system, when the control module identifies a manual driving mode of the motor vehicle.

18. The method of lighting according to claim 15, wherein the choice of the operating parameters comprises speed and/or acceleration of the scrolling of the at least one light signal inside the passenger compartment.

19. A lighting device having dynamic lighting effects for a passenger compartment of a motor vehicle, the passenger compartment having a front passenger area and a rear passenger area, wherein the lighting device comprises:

a lighting system configured to emit at least one light signal producing a dynamic effect of scrolling inside the passenger compartment along a longitudinal axis of the motor vehicle and in a direction opposite to a direction of travel of the motor vehicle, the lighting system having a light assembly extending along a length of the passenger compartment; and a control module configured to receive information originating from an autonomous driving module of the motor vehicle, such that the control module configures the lighting system and controls the at least one light signal on a basis of the information to generate a front light signal to scroll in the front passenger area and to independently generate a rear light signal to scroll in the rear passenger area and to scroll the front light signal at a first scrolling speed and to scroll the rear light signal at a second scrolling speed different from the first scrolling speed, wherein both of the first and second scrolling speeds are proportional to acceleration of the vehicle.

* * * * *